United States Patent [19]
Honda et al.

[11] Patent Number: 5,444,213
[45] Date of Patent: Aug. 22, 1995

[54] REMOTE MAINTENANCE METHOD AND SYSTEM FOR A FUSION REACTOR

[75] Inventors: Keizoh Honda, Ebina; Yoshinobu Makino, Yokohama; Seiichiro Kimura, Inagi; Tsutomu Honda, Tokyo; Nobuo Tachikawa, Ibaraki, all of Japan

[73] Assignee: Kabushiki Kaisha Toshiba, Kawasaki, Japan

[21] Appl. No.: 51,883

[22] Filed: Apr. 26, 1993

[30] Foreign Application Priority Data

Apr. 27, 1992 [JP] Japan ................................. 4-107826

[51] Int. Cl.⁶ .................................................. B23K 26/00
[52] U.S. Cl. ........................... 219/121.76; 219/121.74; 359/618; 376/146
[58] Field of Search ...................... 219/121.76, 121.63, 219/121.64, 121.67, 121.74; 359/618, 627, 853, 855; 376/146, 150, 260, 463

[56] References Cited

U.S. PATENT DOCUMENTS

| | | | |
|---|---|---|---|
| 3,571,554 | 3/1971 | Baujoin | 219/121.76 |
| 4,566,765 | 1/1986 | Miyauchi et al. | 359/618 |
| 4,694,136 | 9/1987 | Kasner et al. | 219/121.74 |
| 4,701,018 | 10/1987 | Loucks | 359/618 |
| 4,707,584 | 11/1987 | Kimbara | 219/121.76 |
| 4,812,613 | 3/1989 | Gorisch | 219/121.74 |
| 4,873,417 | 10/1989 | Moriyasu et al. | 219/121.76 |
| 4,953,950 | 9/1990 | Arata et al. | 219/121.76 |
| 5,138,491 | 8/1992 | Horikawa et al. | 359/627 |

FOREIGN PATENT DOCUMENTS

| | | |
|---|---|---|
| 0130799 | 1/1985 | European Pat. Off. |
| 1561258 | 3/1969 | France |
| 3642386 | 8/1987 | Germany |
| 60-7592 | 2/1985 | Japan ........................ 219/121.64 |
| 63-273582 | 11/1988 | Japan ........................ 219/121.74 |
| 4-344884 | 12/1992 | Japan ........................ 219/121.74 |

OTHER PUBLICATIONS

"Welding Under Extreme Conditions", Proceedings of the International Conference (Helsinki), 4-5 Sep. 1989, pp. 47-56.

Patent Abstracts of Japan, vol. 10, No. 368 (M-543)(2425) 9 Dec. 1986.

Patent Abstracts of Japan, vol. 13, No. 130 (M-808)(3478) 30 Mar. 1989.

Proceedings of the 14th IEEE/NPSS Symposium on Fusion Engineering, vol. 1, 30 Sep. 1991, San Diego, pp. 559-562, XP308364 Mills et al., "The Design, Development and Use of Pipe Cutting Tools for Remote Handling in JET".

*Primary Examiner*—Geoffrey S. Evans
*Attorney, Agent, or Firm*—Foley & Lardner

[57] ABSTRACT

Optical paths of laser beams generated from at least two laser beam generators, which are used for performing connection and cutting work at prescribed locations of structural members, are each switched by corresponding optical path switchers, and the laser beams polarized by the corresponding optical path switchers are reflected in the same direction by a laser beam combiner to combine the plurality of laser beams into a parallel laser beam bundle, in order to perform cutting or welding at the corresponding prescribed location. This configuration removes the need to provide high-power laser beam generators for situations such as vacuum walls of fusion devices where the laser generation efficiency is low, while also making it possible to use more powerful high-power lasers therein if necessary.

12 Claims, 13 Drawing Sheets

REMOTE MAINTENANCE METHOD AND SYSTEM FOR A FUSION REACTOR

BACKGROUND OF THE INVENTION

The present invention relates to a remote maintenance apparatus that is intended to increase the power of combined laser beams which are used in the disassembly of a vacuum wall of a fusion device.

In general, a plasma fusion device wherein a high-temperature plasma is confined within a vacuum wall and a nuclear fusion reaction is generated therein has a configuration such as that shown abbreviated in FIG. 9. A fusion device 1 has a vacuum wall 3 formed of a plurality of segments that create a vacuum boundary around a plasma 2. A toroidal coil 5 and a poloidal coil 6 are arranged around the outside of the vacuum wall 3, and the plasma 2 is confined within the vacuum wall 3 by the electromagnetic force of the toroidal coil 5 and the poloidal coil 6. The fusion device 1 is also provided with an impurity removal device 7 for expelling impurities generated within the plasma 2 to the outside, with a vacuum exhaust duct 8 connected thereto.

Of these structural members, the impurity removal device 7 is subjected to a high-temperature load from the plasma 2 and it is highly likely to receive damage due to impacts from neutrons. Therefore an operator of an impurity removal device 7 that is already installed must consider periodic disassembly and reassembly during the service lifetime of the fusion device 1.

Since the impurity removal device 7 is likely to be damaged by the thermal load received from the plasma, the arrangement is such that it is supplied with cooling water from a cooling piping system 9. Therefore, in order to periodically disassemble the impurity removal device 7, the cooling piping system 9 must be isolated and cut away beforehand, and a connection method such as welding must be used after the reassembly of the impurity removal device 7, to connect the cooling piping system 9. There are various problems involved with this procedure, such that it is not possible to ensure sufficient maintenance space in the peripheral areas of the plasma fusion device for this and similar work of cutting and reconnecting. In particular, with a fusion device intended to generate large levels of energy, since the size of the plasma is set to be relatively large in comparison with the entire body of the device, as shown in FIG. 9, the cooling piping system 9 has to be stacked within a limited space, and thus it is difficult to ensure enough maintenance space around the piping.

A proposed solution to this problem is to use a laser beam from within the cooling piping to cut the piping to disassemble it, or reassemble the piping by laser welding. In other words, a laser processing device 10 is installed in a movable manner within the cooling piping system 9, as shown in FIG. 10, and a laser beam 11 emitted from the outside is guided onto a work site 14 via a focusing lens 12 and a full mirror 13, to enable operation at the work site 14.

Considerations of the amount of water to be used dictate that the diameter of the above-described cooling piping is between 40 mm and 200 mm, the thickness thereof is governed by the water pressure and is thus 3 mm to 15 mm, and the power output required of the laser beam 11 is approximately 3 kW to 25 kW. Therefore, in order to use lasers to cut or weld this cooling piping system 9, a number of laser beam generators 15, each capable of generating a laser beam within the range of approximately 3 kW to 25 kW, must be positioned around the periphery of the fusion device 1 to correspond to the impurity removal device 7, as shown in FIG. 11.

The toroidal coil 5 and vacuum wall 3 shown in FIG. 9 are basic structural members making up the reactor core of the fusion device 1 and, in a conventional fusion device 1, these basic structural elements are not designed to be subject to maintenance or replacement.

However, if by some chance one of these basic structural members should become defective, and if these members are not designed to be maintainable or replaceable, the entire fusion device 1 will be disabled. Accordingly, if the original design did not take periodic replacement into consideration, it is necessary to consider the disassembly and reassembly of these basic structural elements. In particular, it is almost inevitable that the vacuum wall 3 itself could become damaged or defective, and toroidal coil 5 could be damaged too, so it will be necessary to disassemble the vacuum wall into separate segments in order to remove and replace the toroidal coil 5. That is why there is interest in developing a fusion device of a design that takes into consideration the assembly and disassembly of the vacuum wall thereof.

FIG. 12 is a partial plan view of a typical example of replacing a toroidal coil 5 by disassembling part of a vacuum wall 3 into individual segments 3a, 3b, ..., then pulling the toroidal coil 5 and the segment 3a out in the direction of the arrow. The fusion device shown in FIG. 12 makes use of a design that leaves plenty of room in the space within a toroidal plasma, to facilitate disassembly and assembly. However, recent increases in the energy generated by fusion devices have dictated that they are designed so that the size of the plasma is relatively large in comparison with that of the entire device, as shown in FIG. 9.

FIG. 13 is an external view of a case of such a high-power type of fusion device using a segment structure for the vacuum wall. This fusion device 1 is also configured of a large number of segments 3a, 3b, 3c, ..., and it is provided with a toroidal coil 5, a poloidal coil 6, and vacuum exhaust ducts 8. In this case, since there is some space around the outside of the torus, the segments can be connected together in a mechanical fashion by a means such as nuts and bolts. Within the torus, since the segments 3a, 3b, 3c, ..., are in mutual contact, there is virtually no space for installing the nuts and bolts, nor for the work of tightening and removing them. That is why methods are being developed for this type of high-power fusion device to enable disassembly or reassembly by cutting or welding the vacuum wall 3 from the inside, in order to disassemble or reassemble the vacuum wall.

In other words, as shown in FIG. 14, in order to connect the segments 3a, 3b, 3c, ... from the inside, they are welded together at weld portions 3m. Any suitable method can be used for welding the weld portions 3m, such as ordinary arc welding such as TIG or MIG welding, electron beam welding using a high-energy beam, or laser welding. However, arc welding using an arc plasma of a low energy density, such as TIG or MIG welding, has disadvantages such as it not only takes a great deal of time for the welding process, the materials are highly likely to become distorted by the heat, and, particularly when a single segment is reassembled, the fusion device cannot be re-created in the same condition as that at its initial assembly, and the functionality of the entire system can thus be lost. It is difficult to adapt electron beam welding to operations in atmosphere so it is usually done in a vacuum chamber. Thus, with a structure of dimensions of ten to several tens of meters, it is usual to adopt a partial vacuum electron beam welding method that makes use of a partial vacuum device for maintaining an evacuated region only at the area to be welded. However, with this partial vacuum electron beam welding method, it is difficult to maintain vacuum seal portion thereof, which makes this method unsuitable for reassembly welding in a fusion device where the welding is expected to be highly reliable and trustworthy.

On the other hand, the laser welding method is a high-energy beam welding method having the same high welding capability as the electron beam welding method, but welding distortion can be restrained, and this method can also be used in the reassembly welding of a fusion device.

The configuration of a system that uses the laser welding method to weld between segments from within the vacuum wall is shown in FIG. 15. A laser beam transmission system 17 formed of a beam duct connected to a laser beam generator 16 is guided into the interior of a vacuum wall 3 through a maintenance port 18, a laser beam work head 19 linked to the tip of the laser beam transmission system 17 is manipulated to reach a work site, a laser beam 20a generated from the laser beam generator 16 is transmitted via full mirrors 21a and 21b up to the laser beam work head 19, and the laser beam work head 19 is moved in a suitable manner to perform a prescribed job.

The laser beam work head 19 is provided with a focusing optical system 22 for focusing the laser beam 20a within a main work head body 19a, and the laser beam focused by the focusing optical system 22 is emitted from a operating nozzle at the tip, to irradiate a prescribed work site A, as shown in FIG. 16. To supplement the laser work, the main work head body 19a is also provided with an assist gas introduction opening 24 for introducing an assist gas to protect the optical system from spattering metal and metal vapor during the work.

A laser beam transport system shown in FIG. 17 comprises robotics 25 that support the laser beam transmission system 17 formed of the full mirrors and beam duct, and a robot guide used up until the robotics 25 get into the vicinity of the work site. The laser beam is focused at a prescribed energy density by the laser beam work head 19 via the laser beam transmission system 17, to perform an operation such as welding on the prescribed work site A.

The thus-configured laser welding system for welding between segments from within the vacuum wall is used to weld the surface of the vacuum wall, but structural requirements dictate that the thickness of this wall is between 8 mm and 40 mm, or even more, so a laser beam with an output power of approximately 5 kW to 50 kW is necessary. If the system is designed in such a manner that oxygen, nitrogen, or a mixture thereof is used in addition to the assist gas comprising Ar, He, or a mixture thereof that is used during welding, this system can also be used without modification as a laser cutting system.

As described above, the laser processing system makes remote maintenance both feasible and efficient, when it is used in either the disassembly/reassembly of cooling piping for an impurity removal device of a fusion device, or in the disassembly/reassembly between segments of a vacuum wall.

However, in contrast to the wall thickness of the cooling piping which is between 3 mm and 15 mm, the thickness of the vacuum wall is between 8 mm and 40 mm, so the ranges of laser outputs necessary for working with these two thicknesses differ as 3 kW to 25 kW and 5 kW to 50 kW. Therefore, laser beam generators of differing power outputs must be installed around the periphery of the fusion device, as shown in FIG. 18. In other words, laser beam generators 30a and 30b of an output power of 5 kW to 50 kW for cutting or welding between segments from within the vacuum wall must be provided near corresponding maintenance ports 18a and 18b of the fusion device 1, and also laser beam generators 31a, 31b, . . . of an output power of 3 kW to 25 kW for cutting or welding while the cooling piping of the impurity removal device is being disassembled or reassembled must be provided at suitable positions around the periphery of the fusion device 1.

Since this impurity removal device is designed on the assumption that it will undergo periodic disassembly and reassembly during the operating lifetime of the fusion device, the cooling piping is also expected to undergo periodic disassembly and reassembly, so the laser beam generators 31a, 31b, . . . for cutting and welding the piping are used periodically. In other words, a prespecified usage frequency can be expected of these laser beam generators.

However, the system for cutting or welding between segments from within the vacuum wall is provided in case the vacuum wall itself or the basic structural elements such as the toroidal coil should by some mischance become damaged or defective, so the likelihood that the laser beam generators 30a and 30b are used is extremely low. In addition, since these laser beam generators 30a and 30b must put out approximately twice the power output than the other laser beam generators 31a, 31b, . . . for the cooling piping, the laser beam generators 31a, 31b, . . . , cannot be used to replace the laser beam generators 30a and 30b for the vacuum wall. Therefore, expensive dedicated laser beam generators must be provided for the vacuum wall, despite them having such an extremely low operating efficiency.

Thus, in order to prepare for any kind of problem that may occur in a basic structural element, a fusion device remote maintenance system that provides dedicated high-power laser beam generators in the vicinity of maintenance ports in order to disassemble and reassemble segments from within the vacuum wall must be provided. This is a loss from the cost point of view and also the space in the vicinity of the maintenance ports required for placing the high-power laser beam generators is lost. In addition, the provision of laser beam generators that will hardly ever be used could cause further problems such as release of laser gases and the inconvenience of output windows, so that there are problems such as the lasers must be activated at suitable intervals, even when they are not needed.

SUMMARY OF THE INVENTION

The present invention was devised in the light of the above problems and has as its objective the provision of a remote maintenance system wherein there is no particular necessity to provide high-power laser beam generators for purposes such as welding vacuum walls, where the likelihood of such welding is low.

The present invention is characterized in comprising at least two laser beam generators, each being intended for performing cutting or welding work at a prescribed location; an optical path switcher which switches an optical path of each of the laser beams generated from the laser beam generators; and a laser beam combiner which reflects the laser beams that have been polarized by the corresponding optical path switcher into the same direction, and combines the plurality of laser beams into a parallel laser beam bundle.

When the remote maintenance system of the present invention is cutting or welding between segments from within the vacuum wall, which demands a high level of power, the laser beams from the two or more laser beam generators for cooling piping are combined by the laser beam combiner to form a single high-power laser beam, and this laser beam is used for the cutting or welding between segments. Thus, without having to provide any special high-power laser beam generators, but providing the remote maintenance system with a troubleshooting capability, the same high level of performance can be obtained as that when dedicated high-power laser beam generators are provided for the segments.

With the above configuration, the remote maintenance system of the present invention need only be provided with laser beam generators installed for ordinary periodic maintenance, so that when special cutting or welding between segments of the vacuum wall is to be done, a beam combiner can be used to combine laser beams emitted from at least two laser beam generators and form a high-power laser beam therefrom, and this laser beam is guided into the interior of the vacuum wall. Therefore, there is no need to install expensive high-power laser beam generators that are dedicated to the roles of cutting and welding between the segments of the vacuum wall. There is also no need to lose valuable space in the vicinity of the maintenance ports to high-power laser beam generators that are unlikely to be used often. In addition, if by some chance cutting or welding is to be done on the vacuum wall itself or on the toroidal coil in order to cope with some problem, only the laser beam generators used for ordinary periodic maintenance are used, so that the laser work can proceed with an extremely high level of reliability. Moreover, since the beam combiner is designed to combine laser beams generated from low-power laser beam generators into a parallel laser beam, it can be used at a location separated from the work site, which provides the effect of simulating the use of high-power lasers without having to provide high-power laser beam generators.

BRIEF DESCRIPTION OF THE DRAWINGS

FIG. 2 consists of structural diagrams of a laser path switcher, wherein

DETAILED DESCRIPTION OF THE PREFERRED EMBODIMENTS

Embodiments of the present invention will be described below with reference to FIG. 1 to FIG. 8.

Figure 1:
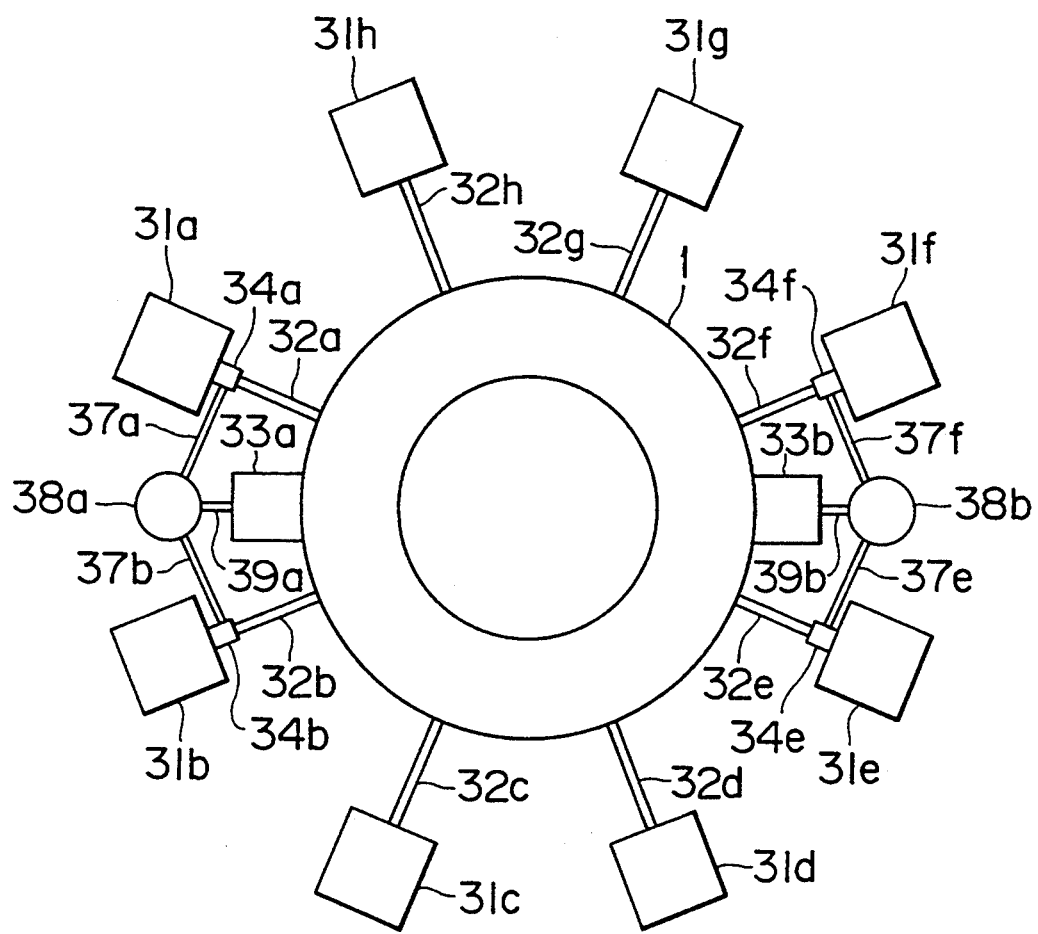
FIG. 1 is a structural diagram of a first embodiment of a remote maintenance apparatus of the present invention.

Laser beam generators 31a, 31b, . . . , and 31h for cutting or welding cooling piping are arranged around the entire periphery of a fusion device 1 corresponding to installation locations of cooling piping of an impurity removal device, as shown in FIG. 1. Each of the laser beam generators 31a, 31b, . . . , 31h is connected to a corresponding laser beam transmission system 32a, 32b, . . . , 32h for guiding a laser beam generated from that laser beam generator into the corresponding cooling piping. Two maintenance ports 33a and 33b are provided on the outer periphery of a diameter of the fusion device 1, to allow periodic maintenance of the impurity removal device.

Figure 2A:
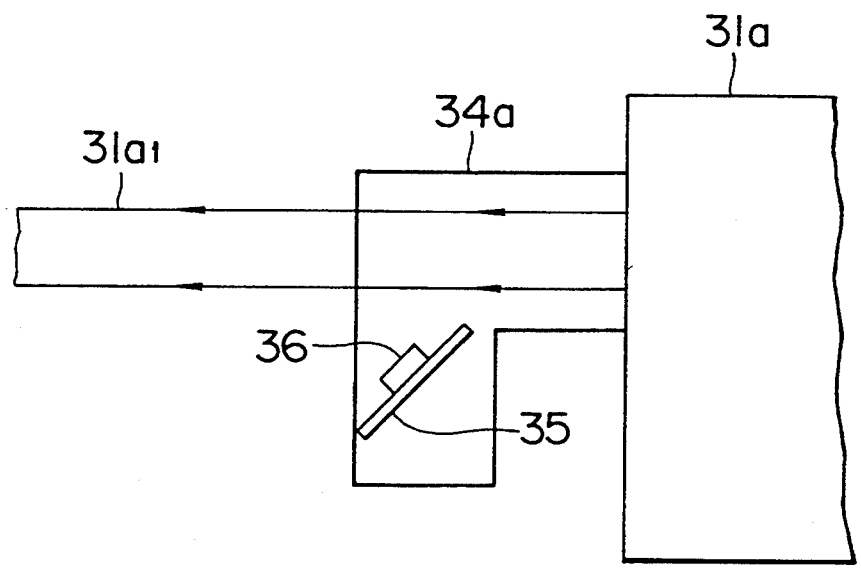
FIG. 2A shows an unswitched laser path and FIG. 2B shows a switched laser path.
Figure 2B:
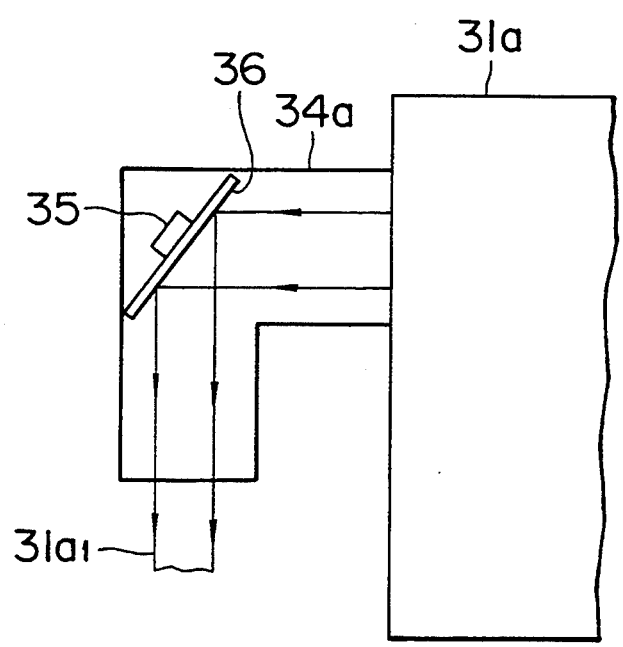

Laser beam outlet ports of the laser beam generators 31a, 31b, 31e, and 31f on either side of the maintenance ports 33a and 33b are provided with corresponding optical path switchers 34a, 34b, 34e, and 34f. Each of the optical path switchers 34a, 34b, 34e, and 34f comprises a full mirror 35, a mirror holder 36 that supports the full mirror 35, and a mirror movement mechanism that is a screw mechanism. If a laser beam $31_{a1}$ generated from the laser beam generator 31a is to be transmitted along a laser beam transmission pipe in order to guide it into the cooling piping of the impurity removal device, the full mirror 35 is held at an inoperative location as shown in FIG. 2A. On the other hand, if it is to be used for cutting or welding in order to disconnect or assemble between segments within the vacuum wall, the full mirror 35 is moved to the location shown in FIG. 2B, to send the laser beam $31_{a1}$ into a beam combiner transmission system 37a (shown in FIG. 1).

Beam combiner transmission systems 37a and 37b are connected to a laser beam combiner 38a, and beam combiner transmission systems 37e and 37f are connected to a beam combiner 38b, as shown in FIG. 1. Each of the beam combiner transmission systems 37a and 37b is provided with a laser beam transmission system 39a or 39b that transmits a laser beam through the maintenance port 33a or 33b to a work head inserted within the vacuum wall.

Figure 3:
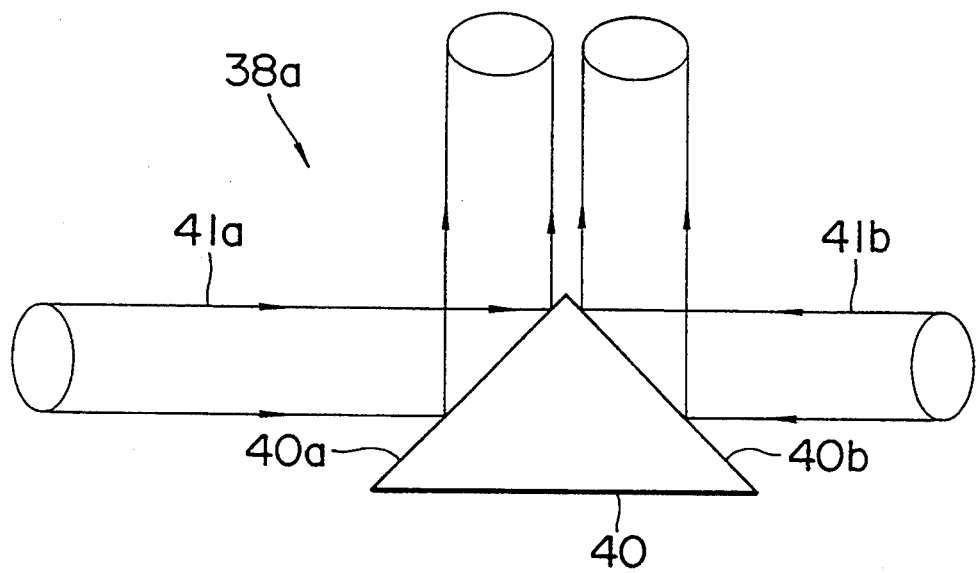
FIG. 3 shows an embodiment of a laser beam combiner.

Each of the laser beam combiners 38a and 38b has a full mirror 40 in the shape of a triangular prism, as shown in FIG. 3. Laser beams 41a and 41b directed at the full mirror 40 and incident thereon from opposite sides thereof are reflected into the same direction by corresponding mirror surfaces 40a and 40b of the full mirror 40. The two beams that have been reflected into the same direction can then be manipulated as a single combined beam. Thus these laser beam combiners 38a and 38b can be used to combine the two beams by the full mirror of triangular prism shape alone, and the combination efficiency (the ratio of the output power of the combined beam to the sum of the powers of the individual laser beams) is also good-affected only by deterioration in the absorption coefficient of the mirror surfaces of the full mirror.

During the ordinary periodic disassembly and reassembly of the cooling piping of the impurity removal device, cutting and welding is done by the laser beam generators 31a, 31b, . . . , 31h provided around the periphery of the fusion device 1 and a laser processing device for piping, in the same way as in the conventional art.

On the other hand, if damage or a defect should occur in the vacuum wall itself or in the toroidal coil, which are structural members, and cutting or welding between segments must be done from within the vacuum wall, the operation is as follows. First the cutting/welding position is determined to see which of the two maintenance ports 33a and 33b is closer. Assuming that maintenance port 33a is the closer, the two laser beam generators 31a and 31b on either side of that port are then activated and also the optical path switchers 34a and 34b are operated, so that the laser beams generated by the laser beam generators 31a and 31b are guided to the laser beam combiner 38a via the beam combiner transmission systems 37a and 37b.

Therefore, the two laser beams are combined by the laser beam combiner 38a to increase the laser power, the combined beam is supplied to the work head within the vacuum wall, through the maintenance port 33a via the laser beam transmission system 39a, and the vacuum wall is cut or welded thereby.

In this case, the combined laser beam that is introduced into the vacuum wall has a power close to the sum of the powers of the laser beams generated by the laser beam generators 31a and 31b, and thus a laser power can be obtained that is far higher than that produced by the individual laser beam generators 31a, 31b, . . . , 31h provided for the-cooling piping. This can remove the various problems involved with using a dedicated laser to cut or weld a vacuum wall of a thickness far greater than that of the cooling piping.

Figure 4:
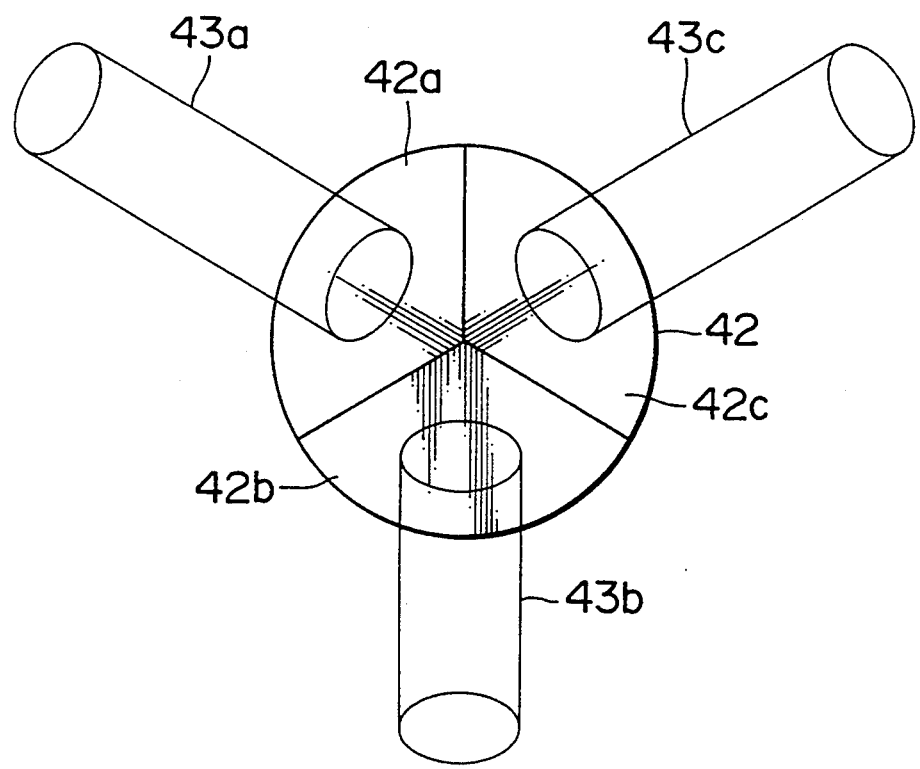
FIG. 4 shows a second embodiment of a laser beam combiner.
Figure 5:
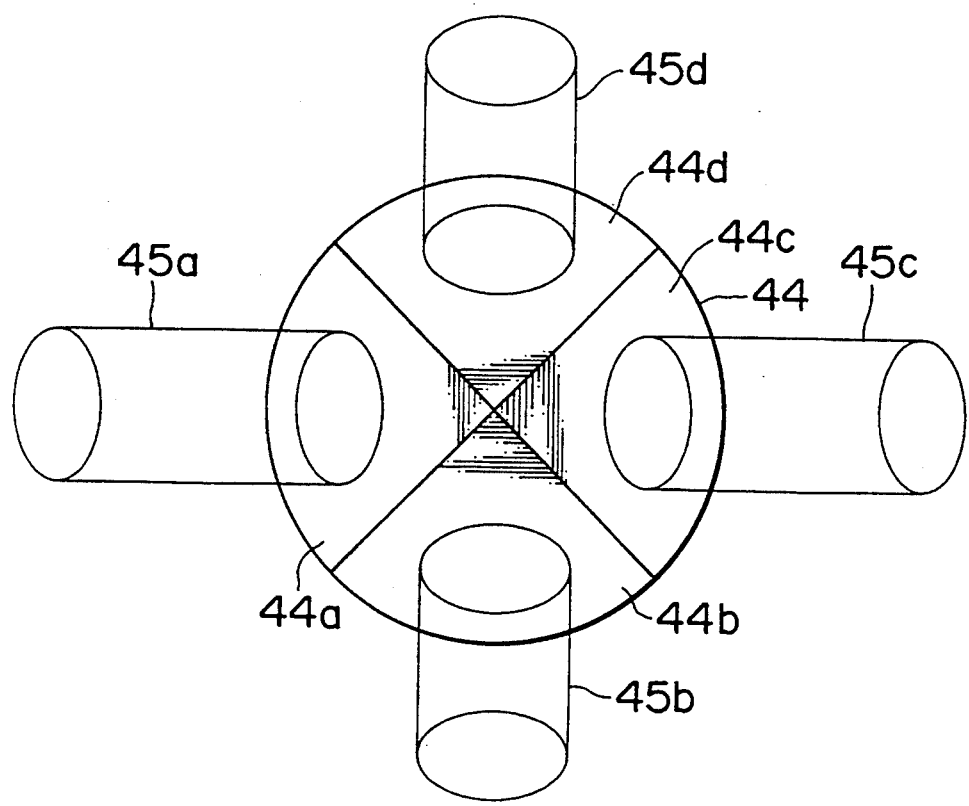
FIG. 5 shows a third embodiment of a laser beam combiner.

It should be obvious to those skilled in the art that the same concept could be applied to enable the laser beam combiners 38a and 39b to combine three or four laser beams instead of two. A laser beam combiner of a type that combines three laser beams is shown in FIG. 4 and a similar one that combines four laser beams is shown in FIG. 5. The laser beam combiner of FIG. 4 presents a full mirror 42 of the shape of a triangular pyramid with a circular base. In a similar manner to that shown in FIG. 3, laser beams 43a, 43b, and 43c that are incident on the full mirror 42 from three directions parallel to the plane of the paper are reflected by corresponding mirror surfaces 42a, 42b, and 42c into a direction perpendicular to the plane of the paper and are combined. The three laser beams reflected into the same direction can subsequently be handled as a single beam by a focusing optical system. Similarly, laser beams 45a, 45b, 45c, and 45d that are incident on a full mirror 44, shown in FIG. 5, from four directions parallel to the plane of the paper can be converted by corresponding mirror surfaces 44a, 44b, 44c, and 44d into a single laser beam in a direction perpendicular to the plane of the paper.

Figure 6:
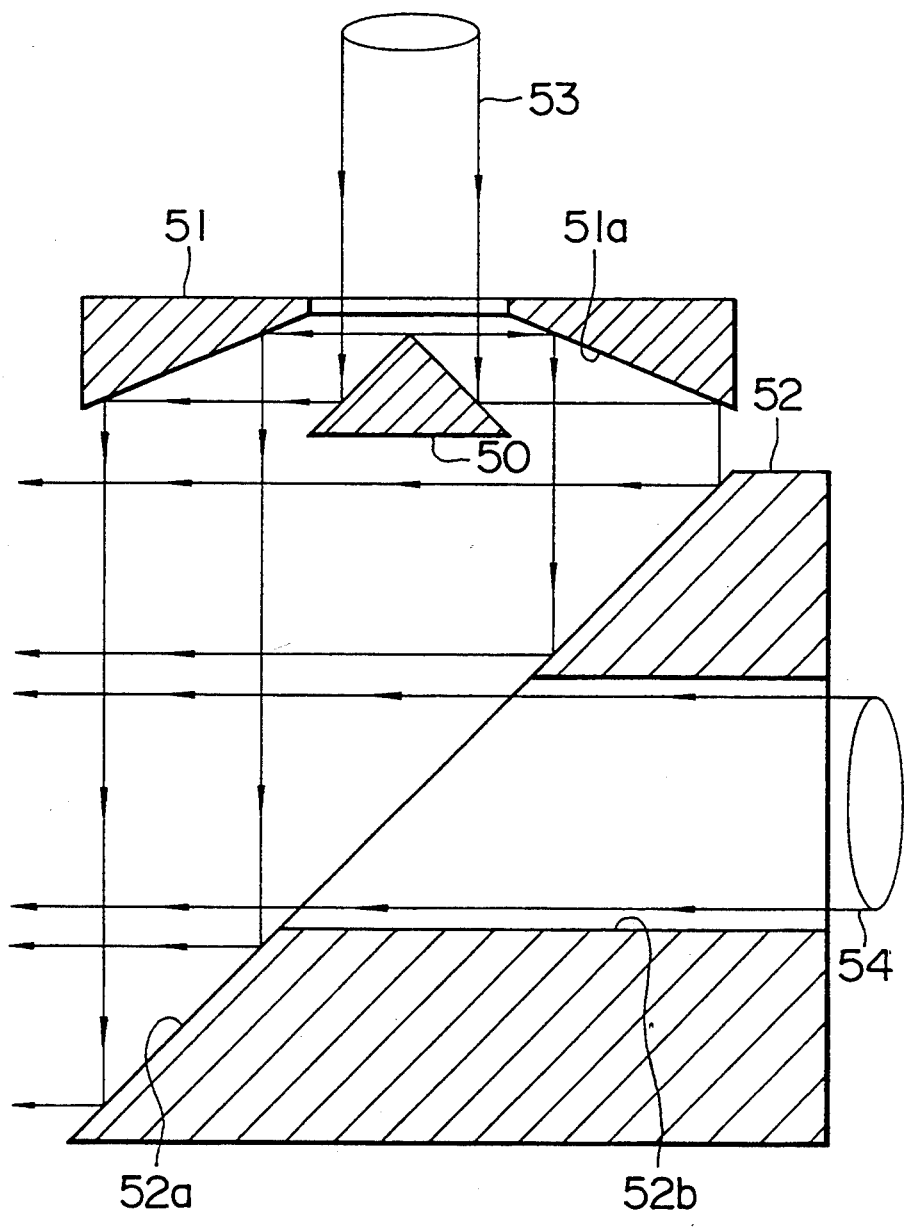
FIG. 6 shows a fourth embodiment of a laser beam combiner.

Another embodiment of the laser beam combiner is provided with a first full mirror 50 of a circular pyramid shape and a second full mirror 51 of a doughnut shape having a slanting mirror surface 51a in a lower surface thereof, as shown in FIG. 6. Below the two mirrors 50 and 51 is provided a third full mirror 52 wherein one end surface thereof forms a mirror surface 52a at an angle with respect to the mirror surface 51a, the third mirror 52 also having a central aperture 52b extending in a direction perpendicular to the axis of the first mirror 50. When a first incident laser beam 53' strikes the first mirror 50, it is converted into an annular laser beam by the first mirror 50 and the second mirror 51, and the annular laser beam is converted to strike the mirror surface 52a of the third mirror 52, which has a central aperture therein extending in an direction perpendicular to the axis of the first mirror 50. When a second incident laser beam 54 is incident through the central aperture 52b of the third mirror 52, the second incident laser beam 54 is concentric with the annular laser beam whose direction has been converted as described above, to obtain a combined laser beam that has a roughly circular cross-section.

The laser beam combiner of the above configuration does require three full mirrors, but the combined laser beam obtained thereby has a circular cross-section and the characteristics of the focused beam obtained after it is incident on a focusing optical system are good.

Figure 7:
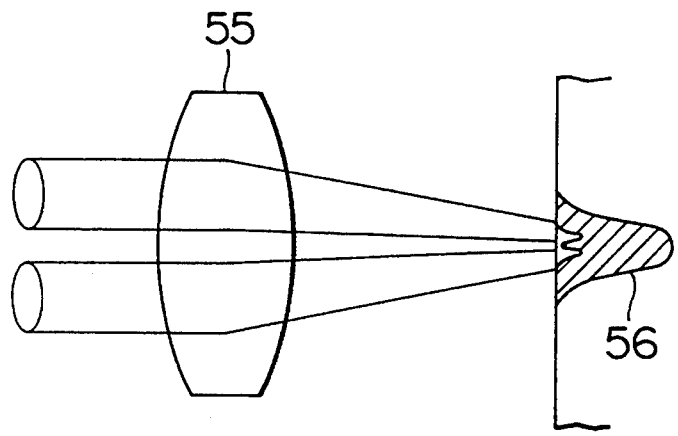
FIG. 7 is an explanatory diagram of an example of working with the combined laser beam.

The configurations of the laser beam combiners shown in FIG. 3 to FIG. 5 are all simple and unlikely to become defective. Even after being focused by a focusing optical system 55, each of the original beams generates a focusing peak so that, as shown in FIG. 7, a combination of two beams generates two peaks after the focusing. If this feature is utilized, a broad weld portion 56 can be obtained therefrom, to enable specific laser working.

Figure 8:
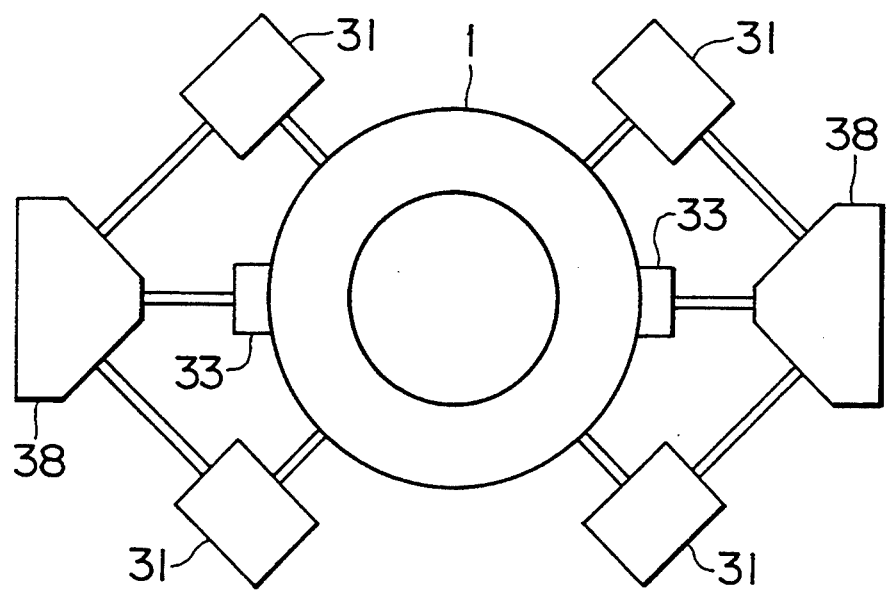
FIG. 8 shows a second embodiment of a remote maintenance apparatus of the present invention.
Figure 9:
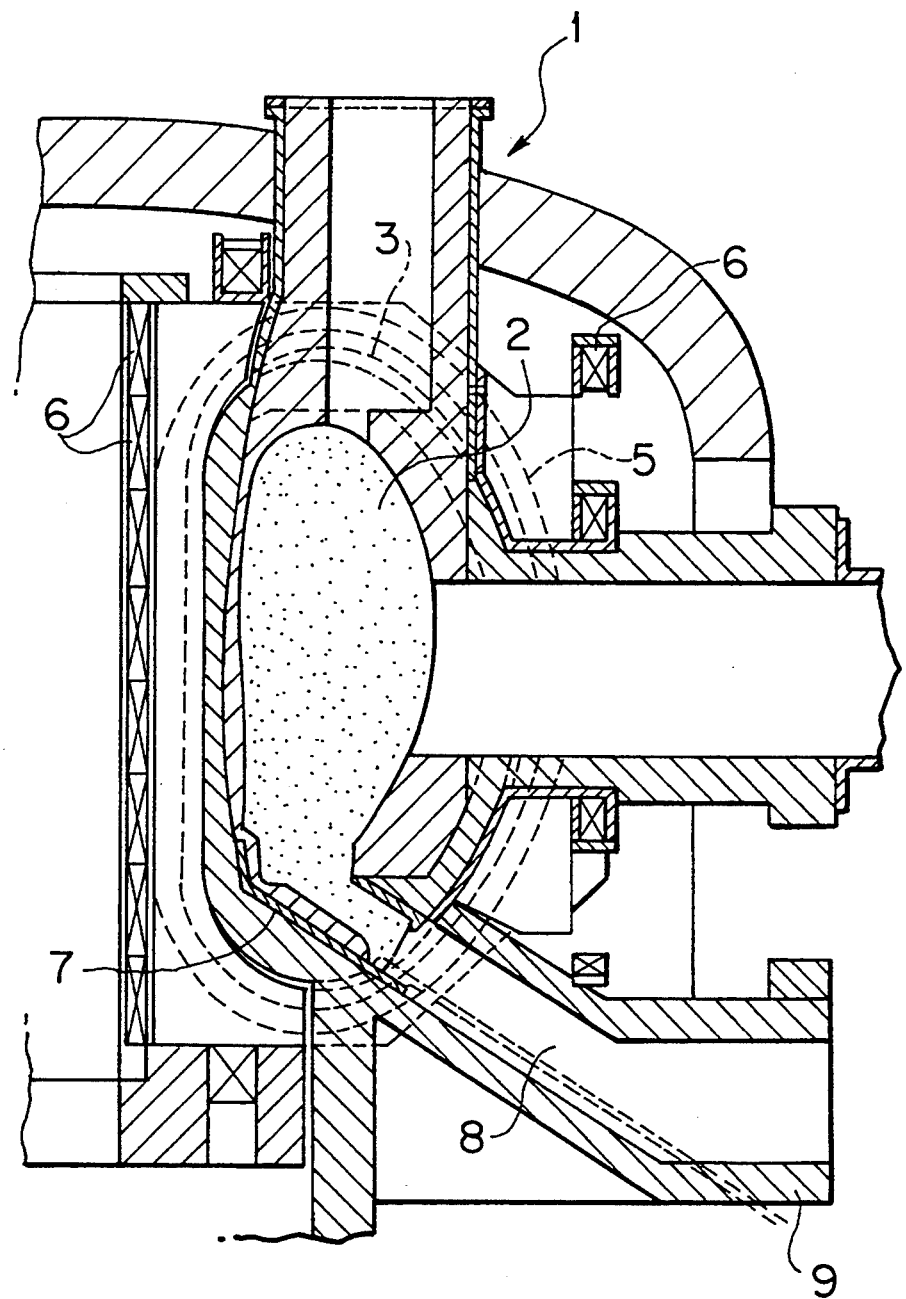
FIG. 9 is a structural diagram of a conventional fusion device.
Figure 10:
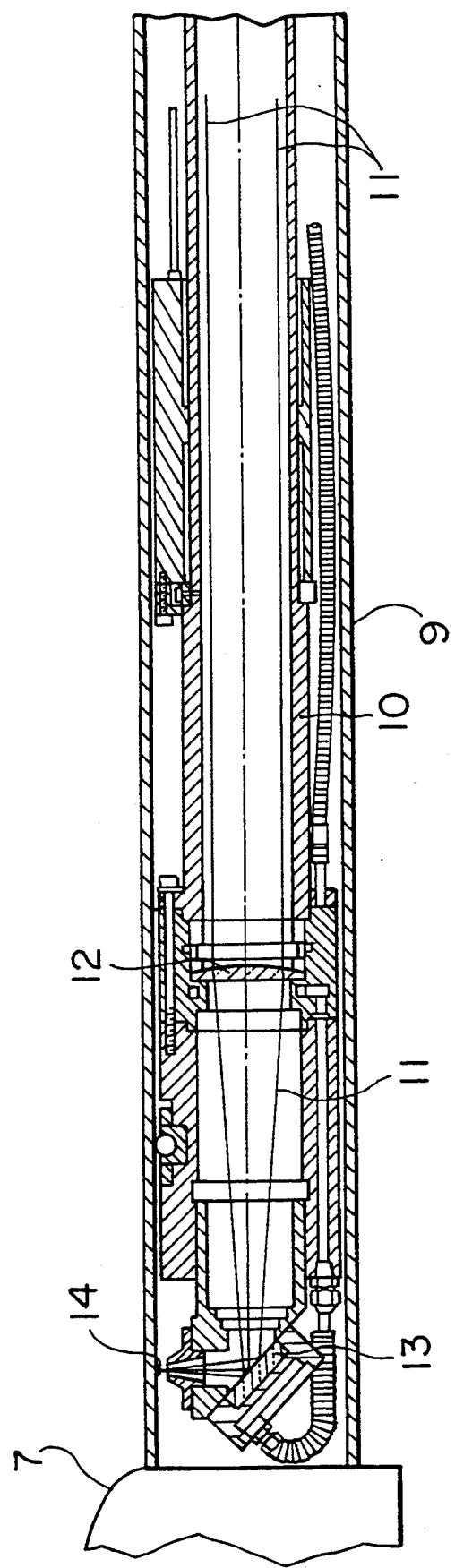
FIG. 10 is an explanatory diagram of a laser processing device for a cooling piping system of an impurity removal device of the conventional fusion device shown in FIG. 9.
Figure 11:
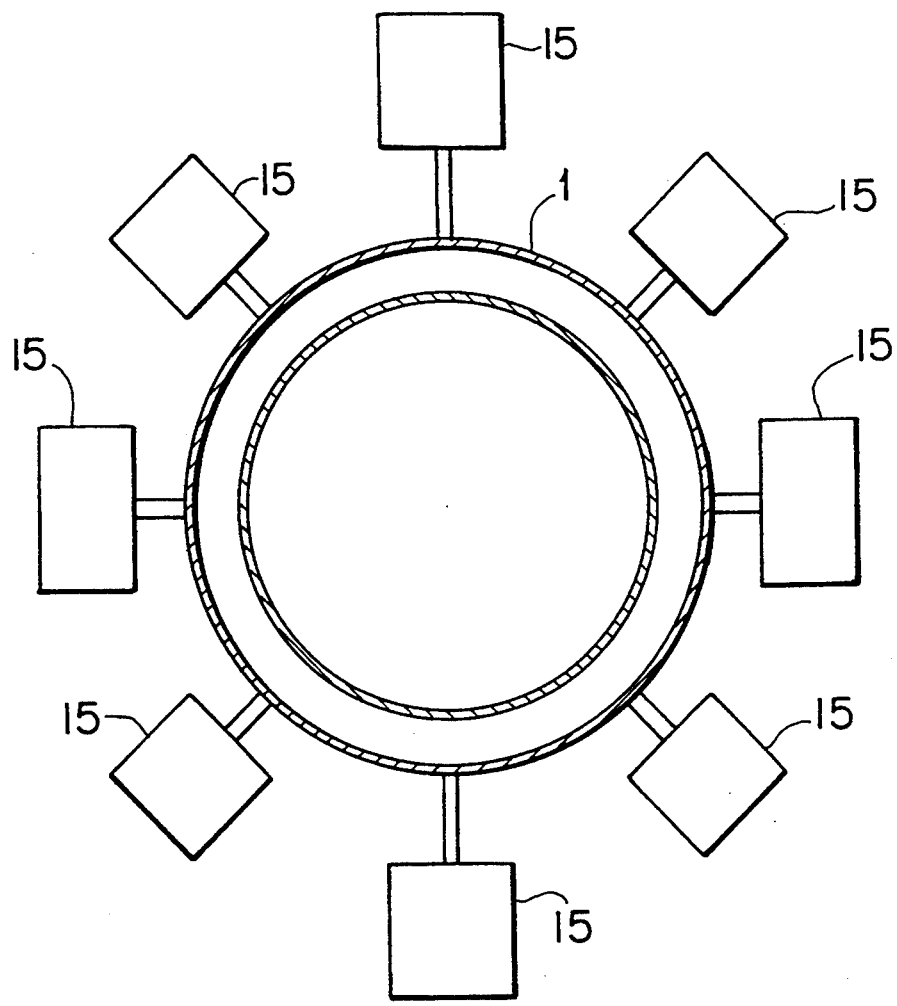
FIG. 11 is a structural diagram of a remote maintenance system for cutting or welding cooling piping in a conventional impurity removal device.
Figure 12:
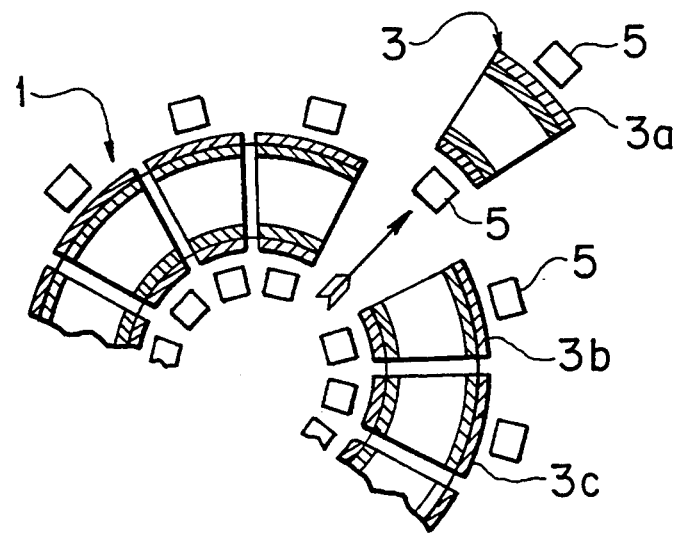
FIG. 12 is an explanatory diagram of a method of disassembling a vacuum wall of a conventional fusion device.
Figure 13:
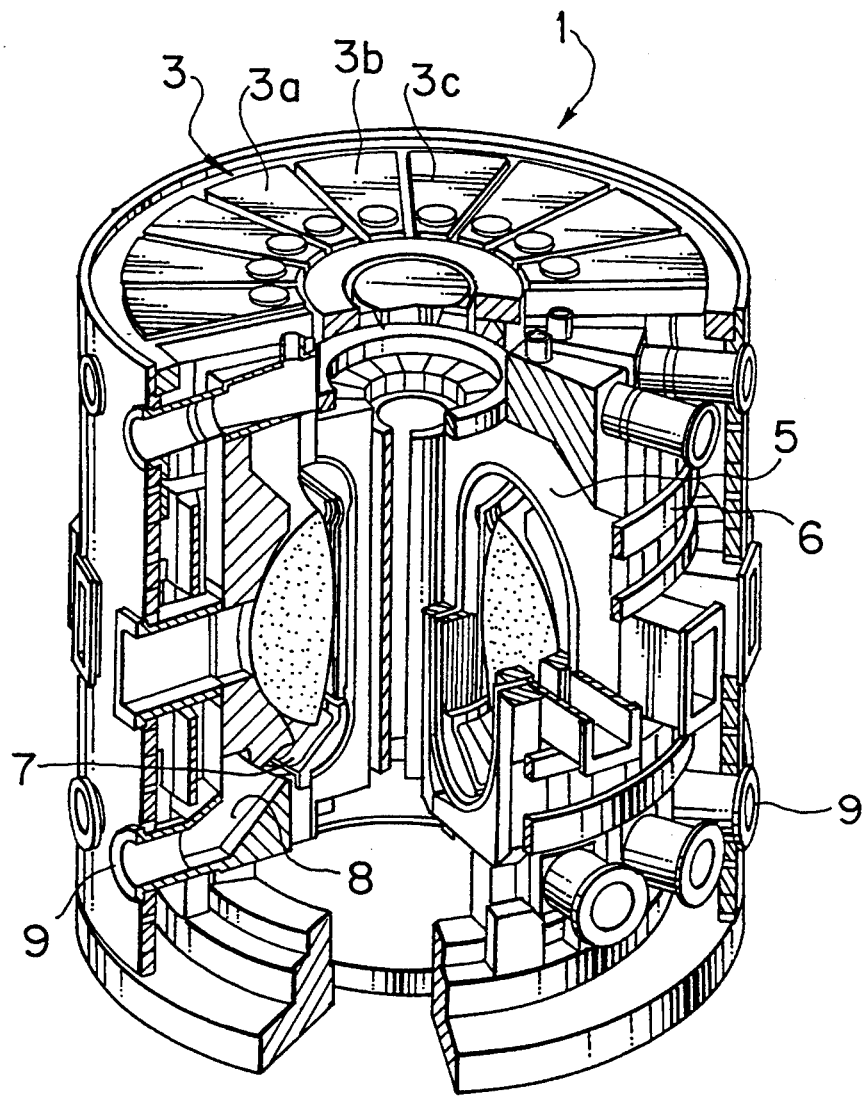
FIG. 13 is a perspective view of a high-power type of fusion device.
Figure 14:
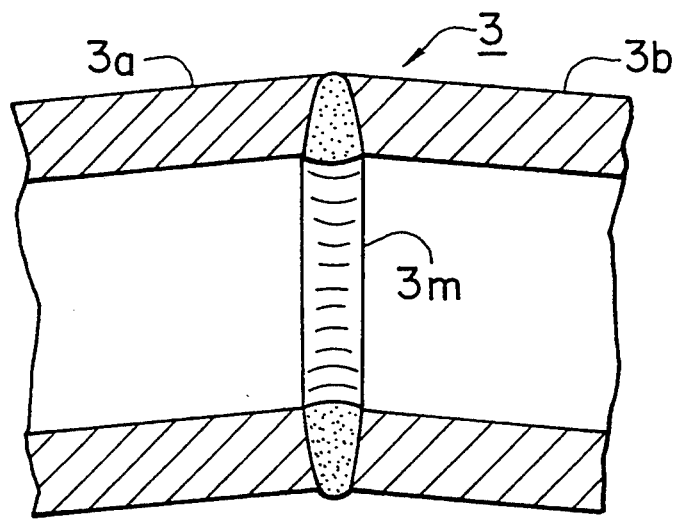
FIG. 14 is a partial cross-sectional view of a joint portion of a segment of the vacuum wall of a fusion device.
Figure 15:
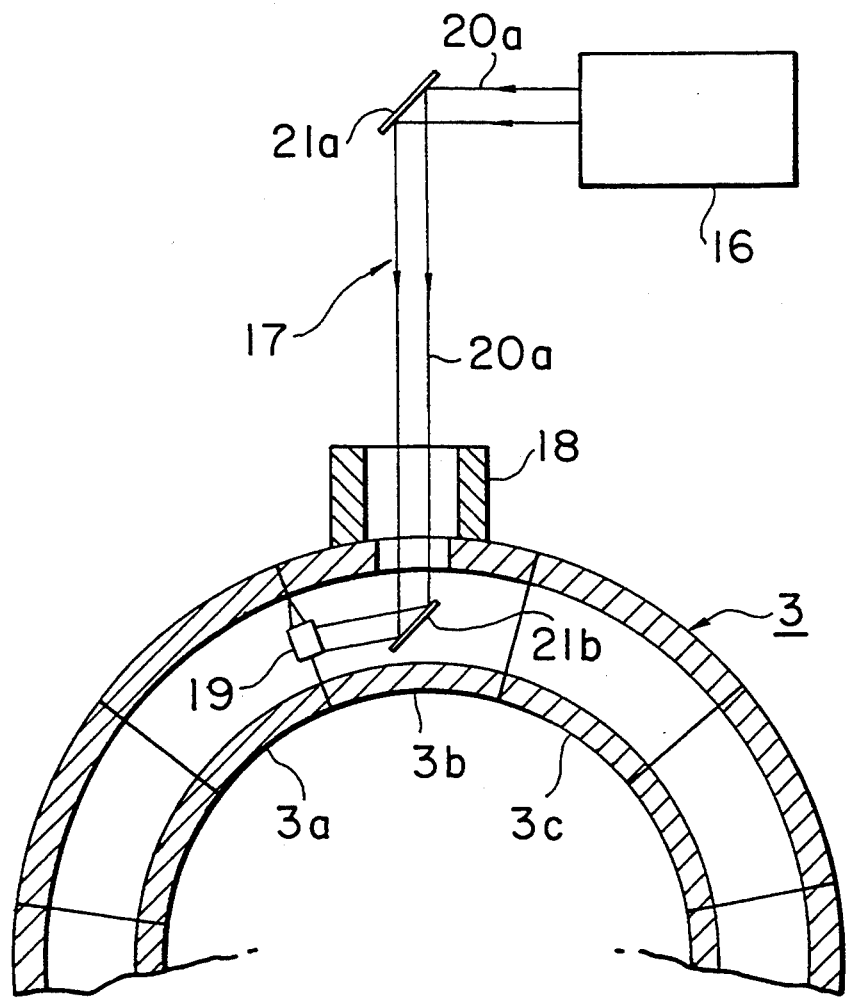
FIG. 15 is a structural diagram of a remote cutting and welding device inserted between segments of a conventional vacuum wall.
Figure 16:
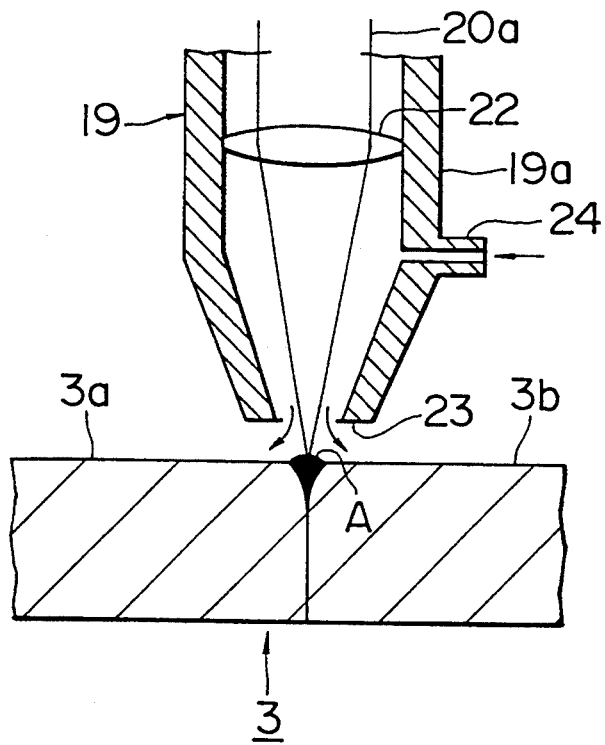
FIG. 16 is an explanatory diagram of a laser work head.
Figure 17:
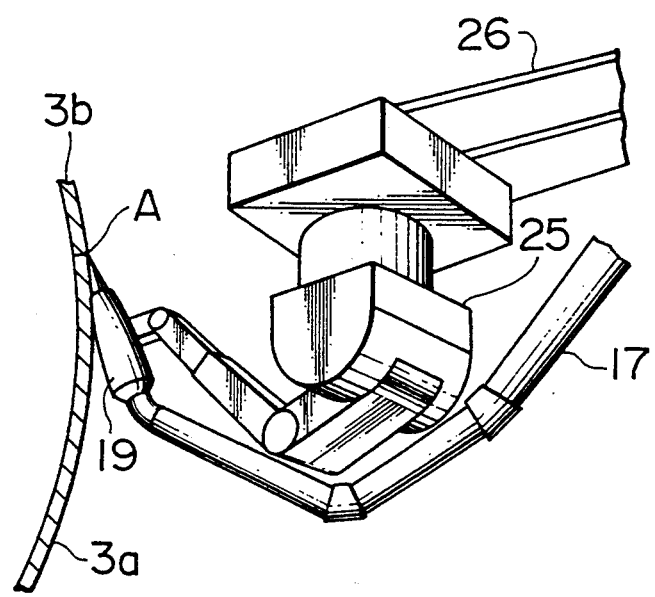
FIG. 17 is an explanatory diagram of a laser robot in a state wherein it is welding between segments.
Figure 18:
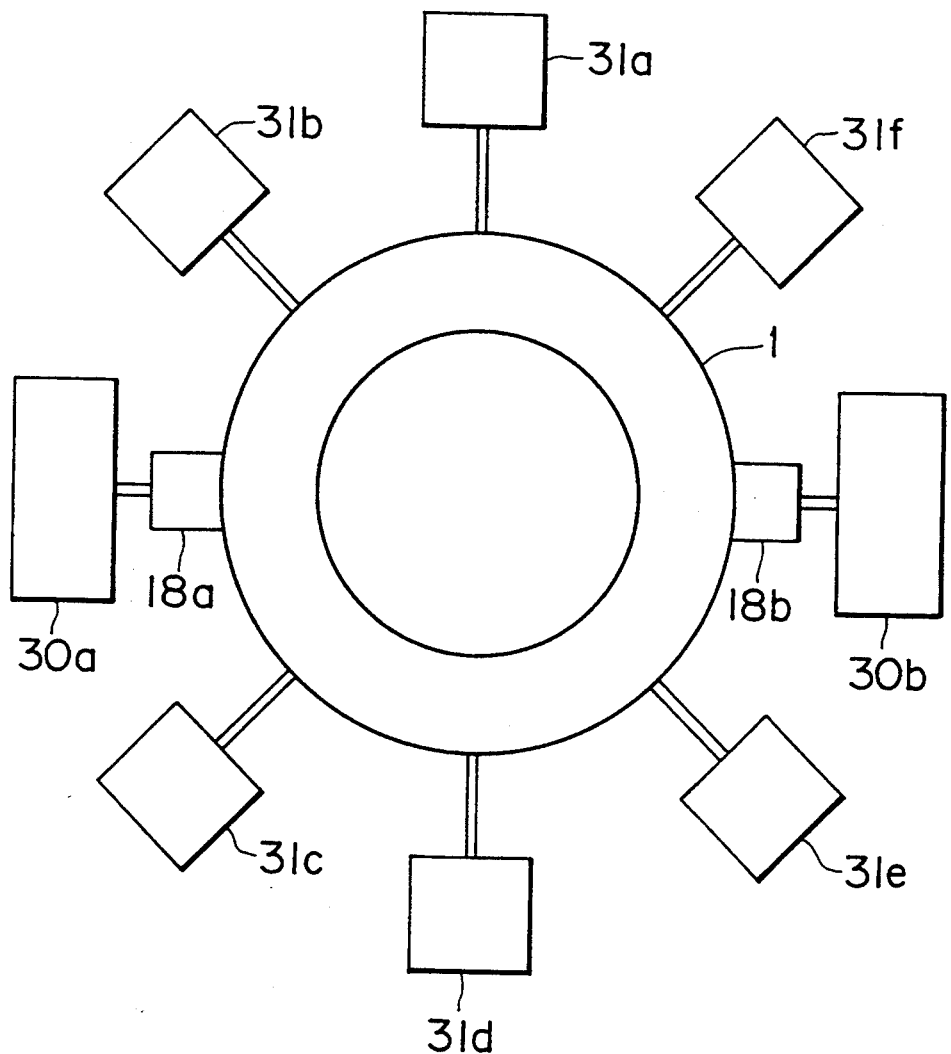
FIG. 18 is a structural diagram of a remote maintenance apparatus of a conventional fusion device.

A second embodiment of the present invention shown in FIG. 8 is provided with four laser beam generators 31, two laser beam combiners, and the laser beams combined by the laser beam combiners are guided into the vacuum wall through two maintenance ports 33 to provide cutting or welding between the segments. It should be obvious to those skilled in the art that, with an even bigger fusion device, eight or more laser beam generators could be provided and three or more laser beams could be combined from these laser beam generators, to obtain effects similar to those described above.

What is claimed is:

1. A remote maintenance method for a fusion reactor comprising the steps of:

generating laser beams from at least two laser beam generators used periodically;

switching an optical path of each of said laser beams generated from said laser beam generators by an optical path switcher; and connecting or disconnecting a prescribed location of a structural member of said fusion reactor through at least two maintenance ports provided on an outer periphery thereof by reflecting said laser beams that have been polarized by said optical path switcher oriented into the same direction, and combining said plurality of laser beams into a parallel laser beam bundle.

2. A remote maintenance system for a fusion reactor comprising:

at least two laser beam generators, each being used periodically, and performing connection and cutting work at a prescribed location of a structural member of said fusion reactor, and having a predetermined output power;

an optical path switcher which switches an optical path of each of said laser beams generated from said laser beam generators;

at least two maintenance ports provided on an outer periphery of said fusion reactor; and a laser beam combiner which is provided adjacent to said maintenance ports and reflects said laser beams that have been polarized by the corresponding optical path switcher oriented into the same direction, and combines said plurality of laser beams oriented into a parallel laser beam bundle having a predetermined output power which is directed to said prescribed location.

3. The remote maintenance system according to claim 2, wherein said laser beam combiner comprises:

a first full mirror which forms an annular laser beam from a first laser beam incident thereto;

a second full mirror which corrects said annular laser beam in the initial direction of incidence of said first laser beam; and a third full mirror which has a central aperture capable of passing said second laser beam, and which modifies and reflects said annular laser beam along the same axis and in the same direction as said second laser beam.

4. The remote maintenance system according to claim 2, wherein said optical path switcher comprises a full mirror and a mirror holder that supports said full mirror, and wherein said full mirror is freely movable by a mirror movement mechanism in a direction in which said laser beam is reflected.

5. The remote maintenance system according to claim 4, wherein said full mirror has a triangular prism shape.

6. The remote maintenance system according to claim 4, wherein said full mirror has a triangular pyramidal shape with a base surface that is circular.

7. The remote maintenance system according to claim 4, wherein said full mirror has a square pyramidal shape with a base surface that is circular.

8. The remote maintenance system according to claim 4, wherein, when said laser beam combiner combines two laser beams, two peaks are created after focusing.

9. The remote maintenance system according to claim 4, wherein four of said laser beam generators and two of said laser beam combiners are provided.

10. The remote maintenance system for a fusion reactor according to claim 2, wherein said predetermined output power of said laser beam generators is equal to at least 10 kW each and the predetermined output power of said parallel laser beam bundle is equal to at least 20 kW.

11. A method of connecting a vacuum wall of a fusion device by means of a laser beam, said method comprising the steps of:

positioning at prescribed locations a plurality of segments making up a vacuum wall of a fusion device;

generating laser beams from at least two laser beam generators;

switching the optical path of each of said laser beams generated by said laser beam generators by an optical path switcher, and polarizing them;

reflecting said laser beams that have been polarized by said optical path switcher into the same direction by means of an optical path switcher, and combining said plurality of laser beams into a parallel laser beam bundle; and irradiating said combined laser beams into a bevelled gap between said segments, through a maintenance port provided in an outer peripheral portion of said vacuum wall, thereby joining said segments into a single unit embedded in molten metal.

12. A method of connecting a vacuum wall of a fusion device by means of a laser beam, said method comprising the steps of:

generating laser beams from at least two laser beam generators;

switching the optical path of each of said laser beams generated by said laser beam generators by an optical path switcher, and polarizing them;

reflecting said laser beams that have been polarized by said optical path switcher into the same direction by means of an optical path switcher, and combining said plurality of laser beams into a parallel laser beam bundle; and irradiating said combined laser beams through a maintenance port provided in an outer peripheral portion of a vacuum wall of a fusion device, thereby cutting a plurality of segments of said vacuum wall.

* * * * *